(12) United States Patent
Brown (10) Patent No.: US 11,339,910 B1
(45) Date of Patent: May 24, 2022

(54) LINE PIPE FIELD JOINT SHROUD (71) Applicant: Brad Brown, Nederland, TX (US)

(72) Inventor: Brad Brown, Nederland, TX (US)

( * ) Notice: Subject to any disclaimer, the term of this patent is extended or adjusted under 35 U.S.C. 154(b) by 0 days.

(21) Appl. No.: 16/994,805

(22) Filed: Aug. 17, 2020

Related U.S. Application Data (60) Provisional application No. 62/888,102, filed on Aug. 16, 2019.

(51) Int. Cl.
*F16L 58/18* (2006.01)
*G01B 5/06* (2006.01)
*F16L 59/12* (2006.01)
*F16L 13/02* (2006.01)

(52) U.S. Cl.
CPC ......... *F16L 58/181* (2013.01); *F16L 13/0272* (2013.01); *F16L 59/12* (2013.01); *G01B 5/066* (2013.01)

(58) Field of Classification Search
CPC ....... F16L 58/18; F16L 58/181; F16L 58/184; F16L 58/185; F16L 58/187; F16L 59/023; F16L 53/38; F16L 53/35; F16L 13/0272; F16L 59/12; G01B 5/066
USPC ....................................... 285/45, 48, 93, 373
See application file for complete search history.

(56) References Cited

U.S. PATENT DOCUMENTS

| | | | |
|---|---|---|---|
| 2,048,424 A | 12/1933 | Caldwell | |
| 2,096,882 A * | 10/1937 | Chernosky | E21B 33/08 166/81.1 |
| 2,137,832 A * | 11/1938 | Cordes | E21B 33/08 166/81.1 |
| 3,307,590 A * | 3/1967 | Carlson | F16L 59/04 138/149 |
| 3,456,965 A | 7/1969 | Gajewski et al. | |
| 3,954,288 A * | 5/1976 | Smith | F16L 1/26 285/93 |
| 4,018,979 A * | 4/1977 | Young | H02G 3/06 174/359 |
| 4,058,328 A * | 11/1977 | Nickerson | A62C 3/04 285/45 |
| 4,111,234 A * | 9/1978 | Wells | F16L 55/172 138/167 |
| 4,282,743 A * | 8/1981 | Pickett | G01M 3/223 73/40.7 |
| 4,607,866 A | 8/1986 | Erlichman | |
| 4,768,813 A * | 9/1988 | Timmons | F16L 21/06 138/99 |

(Continued)

FOREIGN PATENT DOCUMENTS

| | | | | |
|---|---|---|---|---|
| CH | 208911 A | * | 3/1940 | ............... E03B 7/12 |
| WO | 2007121223 | | 10/2007 | |

*Primary Examiner* — David Bochna
(74) *Attorney, Agent, or Firm* — Bushman Werner, P.C.

(57) ABSTRACT

An apparatus for shrouding the coated field joint area of connected line pipe segments, the shroud having first and second housing halves which have end walls which cooperate to form registering openings matching the diameter of the pipe to be shrouded, the housing halves forming a chamber. The housing can be of a clamshell design, being hinged on one side and having hasps, latches or the like on the other side to keep the shroud positioned once it is placed around the coated field joint area of a pipeline. An environment monitor is disposed in the chamber to measure conditions such as relative humidity and temperature.

19 Claims, 8 Drawing Sheets

(56) References Cited

U.S. PATENT DOCUMENTS

| | | | |
|---|---|---|---|
| 4,830,060 A * | 5/1989 | Botsolas | F16L 59/161 |
| | | | 137/375 |
| 4,915,418 A * | 4/1990 | Palatchy | F16L 17/04 |
| | | | 285/24 |
| 4,953,496 A | 9/1990 | Taylor et al. | |
| 5,092,631 A | 3/1992 | Masnik et al. | |
| 5,129,355 A | 7/1992 | Taylor et al. | |
| 5,158,114 A | 10/1992 | Botsolas | |
| 5,265,634 A | 11/1993 | Chapman et al. | |
| 5,269,568 A | 12/1993 | Courturier | |
| 5,312,137 A * | 5/1994 | Nee | F16L 23/167 |
| | | | 285/14 |
| 5,348,044 A * | 9/1994 | Eugene | F16L 35/00 |
| | | | 137/312 |
| 5,458,683 A | 10/1995 | Taylor | |
| 5,489,124 A * | 2/1996 | Nee | F16L 23/167 |
| | | | 285/14 |
| 5,520,734 A | 5/1996 | Taylor et al. | |
| 5,853,030 A * | 12/1998 | Walding | F16L 41/12 |
| | | | 138/99 |
| 5,926,936 A * | 7/1999 | Ikeda | B29C 63/0047 |
| | | | 29/460 |
| 6,059,319 A * | 5/2000 | Wyke | B29C 65/344 |
| | | | 219/535 |
| 6,131,957 A * | 10/2000 | Saito | F16L 21/04 |
| | | | 285/133.21 |
| 6,881,901 B2 * | 4/2005 | Egan | H02G 15/013 |
| | | | 16/2.1 |
| 7,367,362 B2 * | 5/2008 | Rice | B29C 70/32 |
| | | | 138/172 |
| 7,520,535 B2 | 4/2009 | Gronquist | |
| 7,628,428 B2 | 12/2009 | Rampton et al. | |
| 7,823,643 B2 * | 11/2010 | Wong | E21B 36/003 |
| | | | 166/302 |
| 8,210,210 B2 * | 7/2012 | Clark | F16L 55/168 |
| | | | 138/99 |
| 8,240,167 B2 * | 8/2012 | Ingram | F16L 55/103 |
| | | | 62/259.4 |
| 8,919,450 B1 * | 12/2014 | Cruz | E21B 36/003 |
| | | | 166/368 |
| 10,738,931 B2 * | 8/2020 | Suarez-Valdes Suarez | |
| | | | F16L 59/185 |
| 2003/0184083 A1 * | 10/2003 | Linam | F16L 19/00 |
| | | | 285/45 |
| 2006/0289471 A1 * | 12/2006 | Sasaki | F16L 53/38 |
| | | | 219/535 |
| 2014/0284914 A1 | 9/2014 | Tsambarlis | |
| 2019/0040989 A1 | 2/2019 | Vinokurov et al. | |

* cited by examiner

LINE PIPE FIELD JOINT SHROUD

CROSS REFERENCE TO RELATED APPLICATION

This application claims priority to U.S. Application No. 62/888,102 filed on Aug. 16, 2019, the disclosure of which is incorporated herein by reference for all purposes.

FIELD OF THE INVENTION

The present invention relates to pipeline construction and, more particularly, to a system for use in the laying of line pipe for the transmission of oil and gas.

BACKGROUND OF THE INVENTION

Line pipe, i.e., pipe used to construct oil and gas pipelines, generally ranges from about 8 to 60 inches in diameter with the individual pipe segments being approximately 30 to 40 feet in length. Prior to being transported to the field for installation, the line pipe segments are coated with epoxy or various other coatings generally referred to as the mainline coating. However, the mainline coating does not extend to the ends of the pipe segment. Indeed there is generally 2 to 4 inches of uncoated pipe at each end of each pipe segment.

Once the pipe segments are positioned in substantially end-to-end relationship longitudinally along the trench, they are sequentially welded together to form a field joint. The field joint and the original uncoated section or field joint area (FJA) are sand blasted, and the FJA is coated with epoxy or a similar coating to produce a coated FJA. The connected pipe segments are then lowered into the trench.

As is well known to those skilled in the art, the pipe coatings used require a certain period of time to cure in order that they form an impervious coating on the pipe. During this curing period, it is important that the coating be maintained, to the extent possible, free of rain, dust, and other particulates that can interfere with the curing and/or integrity of the coating. The mainline coating is done in facilities where it is relatively easy to ensure the coating is not contaminated prior to curing. However, in the field, coating the FJA presents difficulties in ensuring that dust, dirt, rain, or other impurities are not introduced onto the coated FJA before it cures.

Further, efficient curing of the coating can be enhanced by monitoring and to the extent possible controlling conditions such as relative humidity, temperature, etc. in the area immediately surrounding the coated FJA.

Currently, when two segments of pipe are welded together, sand blasted, and coated to form a coated FJA, the coated FJA is tented or covered to prevent dust, rain, sand, etc. from contacting the uncured coating. Tenting of these freshly coated FJAs is a labor intensive, time consuming process.

SUMMARY OF THE INVENTION

In one aspect, the present invention relates to an apparatus for protecting a freshly field coated pipeline segment from contamination by dust or the elements.

In another aspect, the present invention relates to a shroud which can be selectively placed over and removed from a coated FJA.

In yet another aspect, the present invention provides a shroud or housing for covering a coated FJA wherein the shroud has LAN/Wi-Fi and Bluetooth connectivity.

In still another aspect, the present invention provides a housing forming a chamber in which an FJA is received, the chamber being monitored for environmental conditions such as temperature, relative humidity, etc.

In still a further aspect, the present invention provides a shroud for a coated FJA which is operative to heat the area around the coated FJA.

In another aspect, the shroud of the present invention can determine the thickness of the mainline coating and the field applied coating of the coated FJA.

These and further features and advantages of the present invention will become apparent from the following detailed description, wherein reference is made to the figures in the accompanying drawings.

DETAILED DESCRIPTION OF PREFERRED EMBODIMENTS

In general, the shroud of the invention comprises a split sleeve having end plates which cooperate to form a chamber, the coated FJA being disposed in the chamber when the shroud of the present invention is in use.

Figure 1:
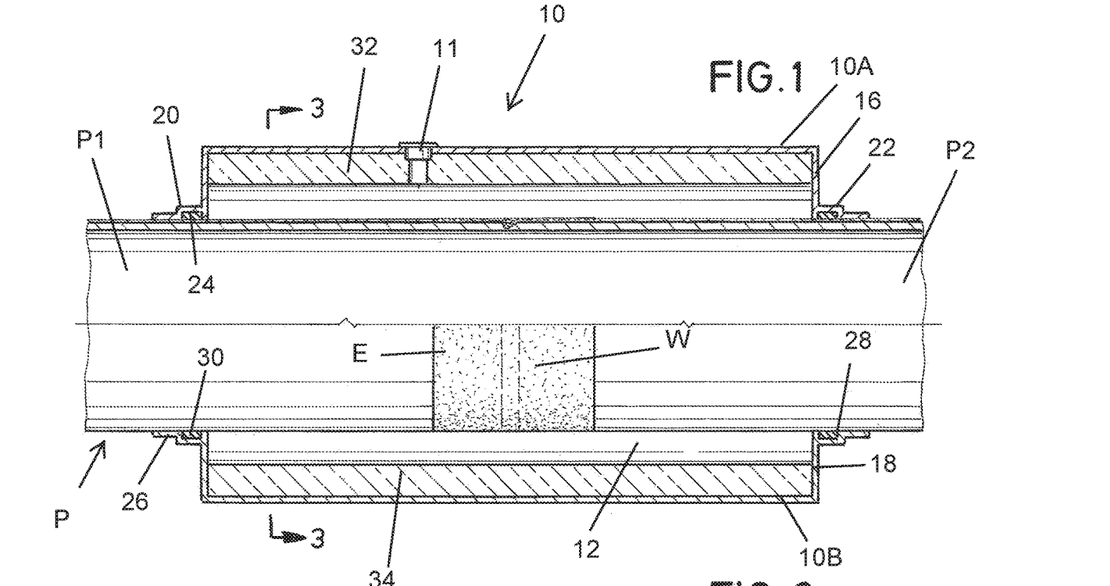
FIG. 1 is a side elevational view, partly in section, showing one embodiment of the shroud of the present invention.

Turning then to FIG. 1, there is shown a section of pipeline P comprising pipeline segments P1 and P2. The segments P1 and P2 are welded together at their abutting faces as shown at W. a protective coating such as epoxy E being applied to and overlying the weld W and adjoining sections of pipe segments P1 and P2, thus forming a field-coated FJA.

Figure 2:
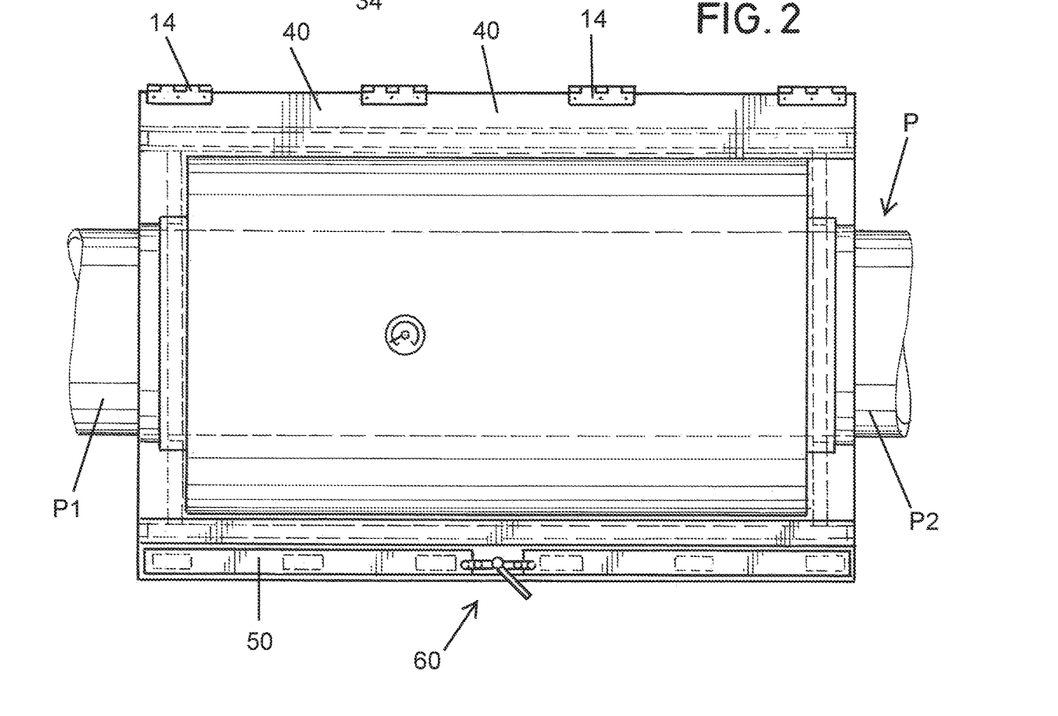
FIG. 2 is a view similar to FIG. 1, rotated 90° on its axis.

In the embodiment of the present invention shown in FIGS. 1-4, the shroud, shown generally as 10, comprises first and second semicylindrical sections 10A and 10B forming a chamber 12 therein, the coated FJA being disposed in chamber 12. As best seen in FIG. 2, housing sections 10A and 10B are connected in part by a series of hinges 14 whereby the sections 10A and 10B can be separated in clamshell fashion. Each of the housing sections 10A and 10B have semicircular end walls 16 and 18 respectively. Extending axially outwardly, from semicircular end wall 16 is a flange 20 forming a recess 22 in which is received a gasket 24. In like fashion, extending axially outwardly from end wall 18 is a flange 26 forming a recess 28 in which is received a gasket 30. Gaskets 24 and 30 ensure that when the shroud 10 is in surrounding relationship to the coated FJA, there is a seal formed around pipe segments P1 and P2, respectively.

A first section of insulating material 32 is attached to the inner surface of housing section 10A and a second section of insulating material 34 is attached to the inner surface of housing section 10B.

A well 11 extends through housing section 10A to receive a sensor which can determine temperature and relative humidity in chamber 12.

Figure 3:
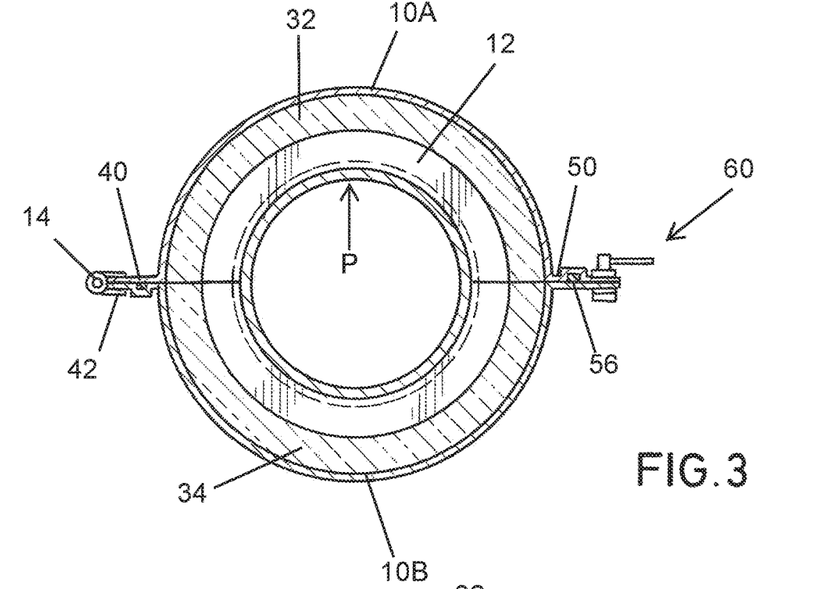
FIG. 3 is a cross-sectional view taken along the lines 3-3 of FIG. 1.
Figure 4:
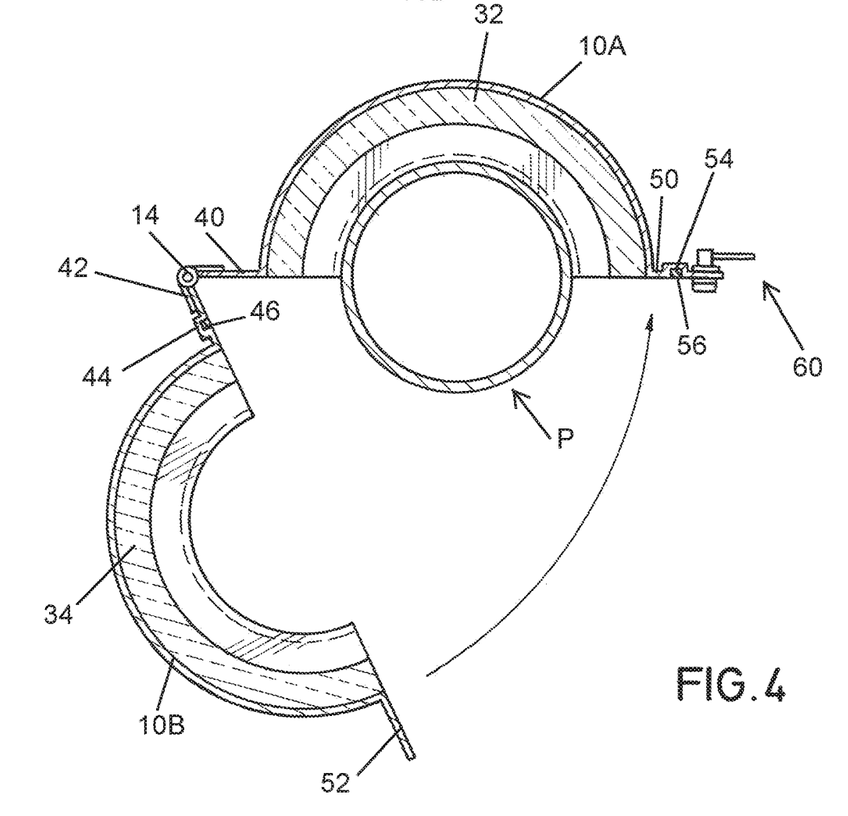
FIG. 4 shows the shroud depicted in FIG. 3 in an open position.

As best seen with reference to FIGS. 2-4, hinges 14 are connected to housing sections 10A and 10B by means of laterally outwardly extending flanges 40 and 42, respectively, which in this embodiment form the edges of the housing sections. As can be seen, flange 42 has a longitudinally extending recess 44 into which is received a gasket 46.

There is a second pair of laterally outwardly extending flanges 50 and 52 which extend longitudinally along housing sections 10A and 10B, respectively, flange 50 having a longitudinally extending recess 54 into which is received a gasket 56. It will thus be appreciated that when housing sections 10A and 10B are in the closed position as shown in FIG. 3, gaskets 46 and 56 provide sealing and in conjunction with gaskets 24, 30 effectively seal off chamber 12. As can also be seen in FIGS. 2-4, there is a latching mechanism 60, the details of which are described hereafter.

Figure 5:
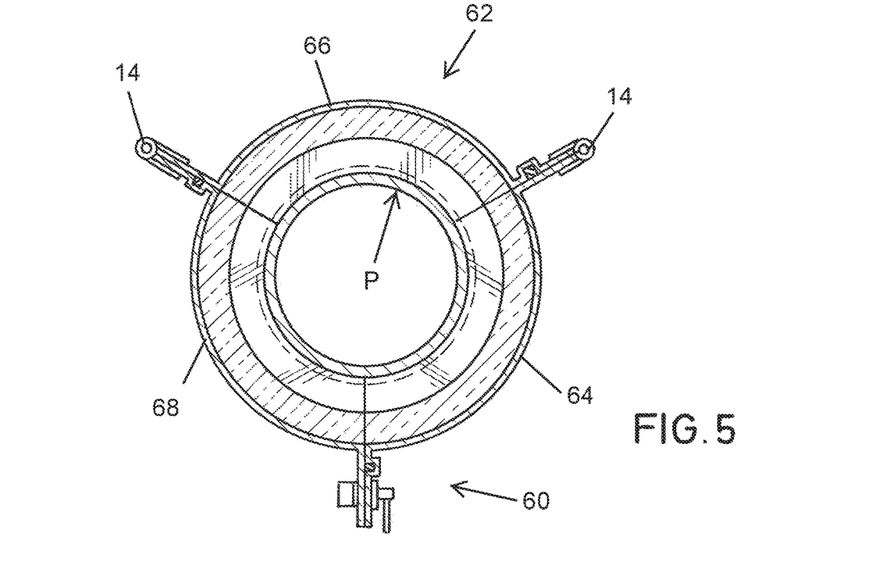
FIG. 5 is a view similar to FIG. 4 but showing the shroud made from three body sections.
Figure 6:
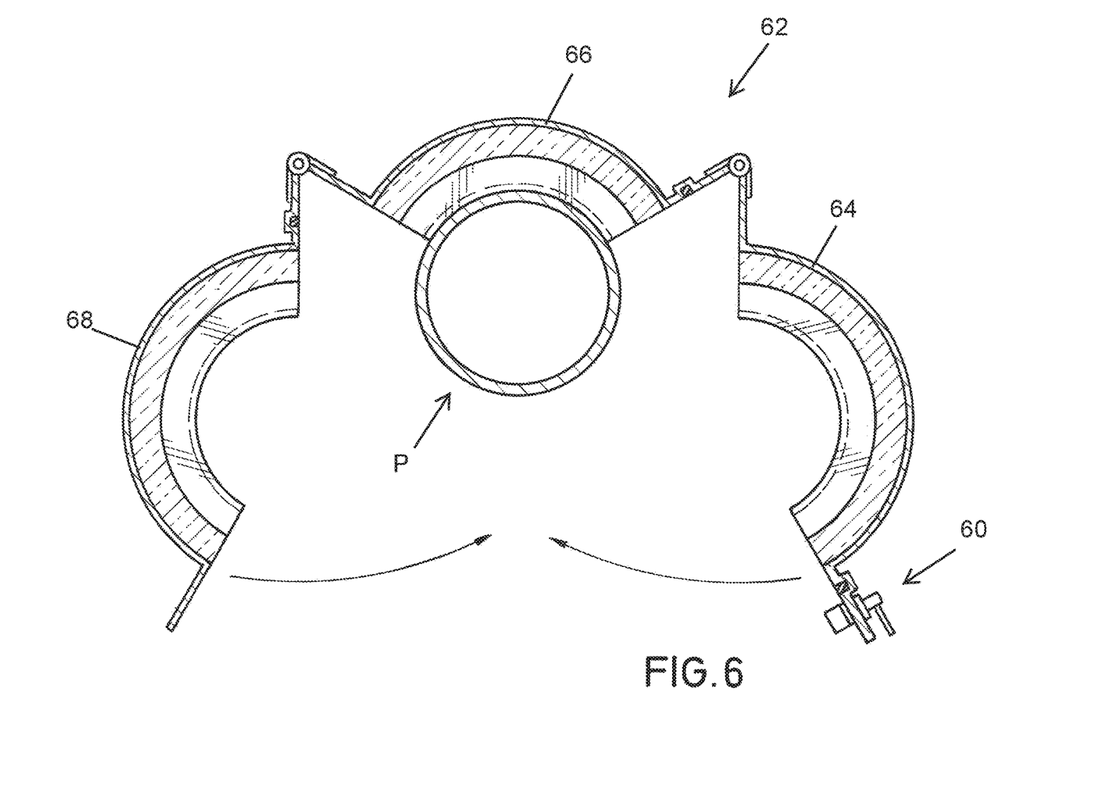
FIG. 6 shows the shroud of FIG. 5 in an open position.

Referring now to FIGS. 5 and 6, there is shown another embodiment of the present invention wherein the housing comprises three housing sections. The shroud assembly shown generally as 62 in FIGS. 5 and 6 comprises housing sections 64, 66, and 68. Housing sections 64 and 68 are hingedly connected to intermediate housing section 66 by the hinge flange assemblies described above with respect to the embodiments of FIGS. 1-4. Additionally, sections 64 and 68 can be latched together using the latch 60 as described hereafter. Other than the housing sections of the shroud 62 being in three sections, it can be seen from FIGS. 5 and 6 that the construction of shroud 62 is substantially the same as that of the shroud shown in FIGS. 1-4.

As described above, the respective housing sections have laterally outwardly extending flanges to which the hinges or latching mechanisms are attached. It is to be understood that such flanges are not necessary and that he hinges could be attached to adjoining housing section walls directly and that the latching mechanism could comprise spring loaded toggle latch catch clamps, commonly seen on trunks, cases, chests, etc. Furthermore, depending on the number of housing sections, there will be at least two pair, and by way of example, in the case of the embodiment of FIGS. 5 and 6, three pair of longitudinally aligned edges. Preferably, in all cases respective pairs of longitudinally lined edges and the inner surfaces of the end plates will have suitable gasketing or seals.

Figure 7:
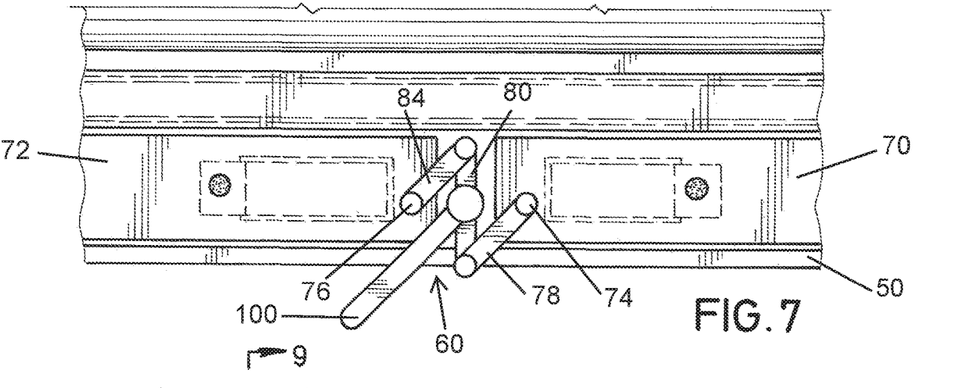
FIG. 7 shows a partial side elevational view of a shroud of FIG. 2 and showing in particular a latching mechanism.
Figures 8, 9:
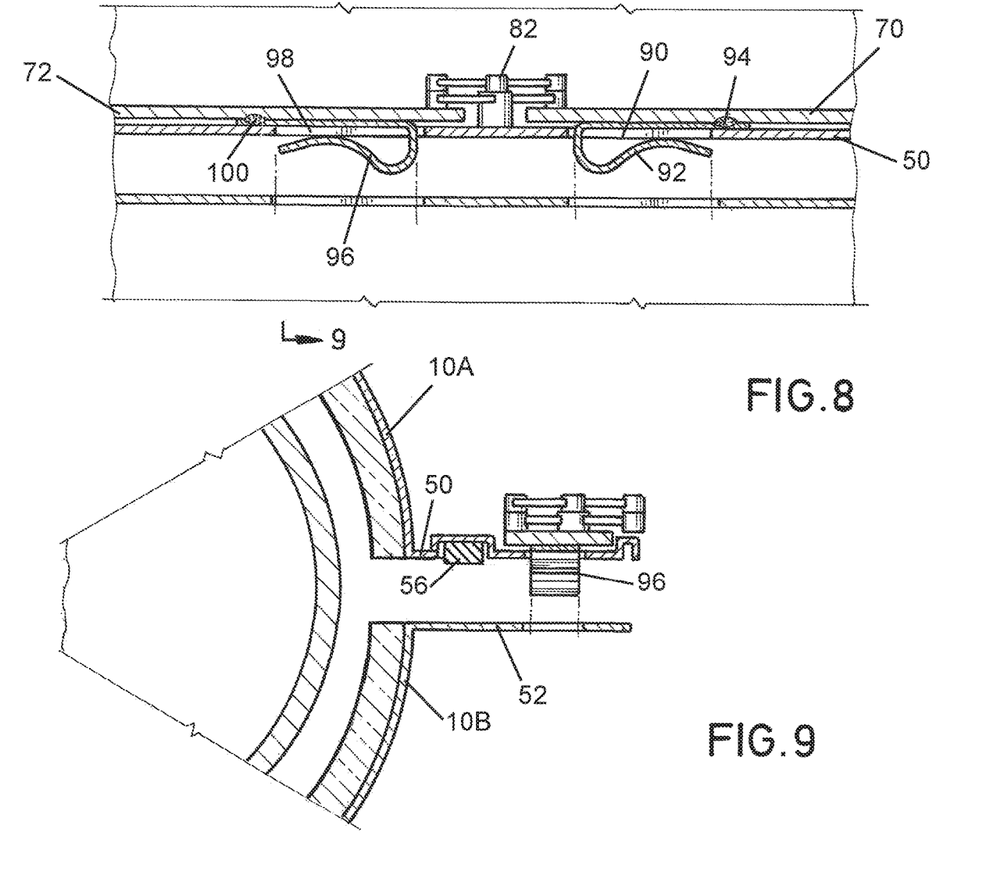
FIG. 8 is an elevational view partly in section showing the details of the latching mechanism shown in FIG. 7 in the open position.
FIG. 9 is a view taken along the lines 9-9 of FIG. 8.

Turning now to FIGS. 7-9, latch assembly 60 comprises first and second movable plates 70 and 72 which connect to pivot assemblies 74 and 76, respectively. Pivot assembly 74, via link 78, is in turn pivotally connected to an intermediate link 80. Link 80 is connected to a center pivot assembly 82 and is also connected to a second link 84 which in turn is pivotally connected to pivot assembly 76.

Flange 52 has a first opening 90 through which extends a leaf spring 92, one end of spring 92 being welded as at 94 to plate 70. In like fashion, there is a second opening 98 through flange 52, leaf spring 91 extending therethrough and having one end welded to plate 72 as shown at 100. As noted, in the embodiment shown in FIGS. 7-9, the shroud is in the open position in the sense that it has not been latched together to form the closed chamber.

Figure 10:
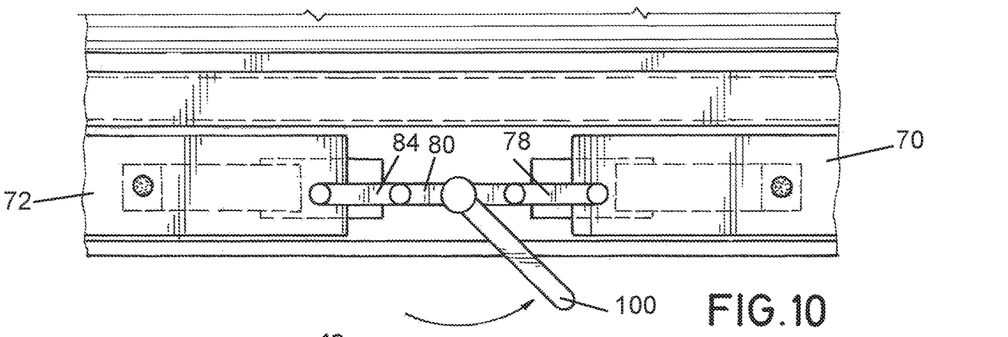
FIG. 10 is a view of the shroud with the latching mechanism in the closed position.
Figure 11:
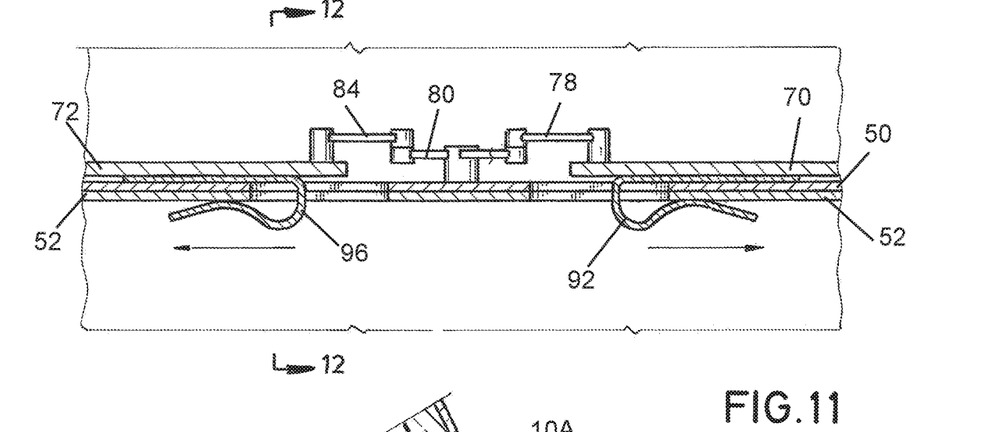
FIG. 11 is a side, cross-sectional view showing the details of the latching mechanism shown in FIG. 10.
Figure 12:
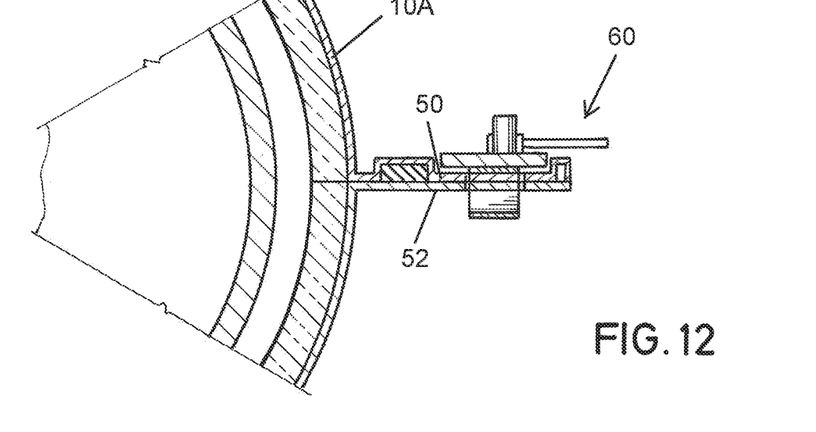
FIG. 12 is a view taken along the lines 12-12 of FIG. 11.

Turning now to FIG. 10, it can be seen that if lever 100 is moved in the direction of the arrow, the links 78, 80, and 84 would longitudinally align, moving the plates 70 and 72 apart from one another. Since the leaf springs 92 and 96 are connected to the plates 70 and 72, they will move in the direction shown by the arrows in FIG. 11. Accordingly, when flange 50 is compressed against 52, the free end of the springs 92 and 96 will be forced under flange 52, biasing flange 52 against flange 50.

Figure 13:
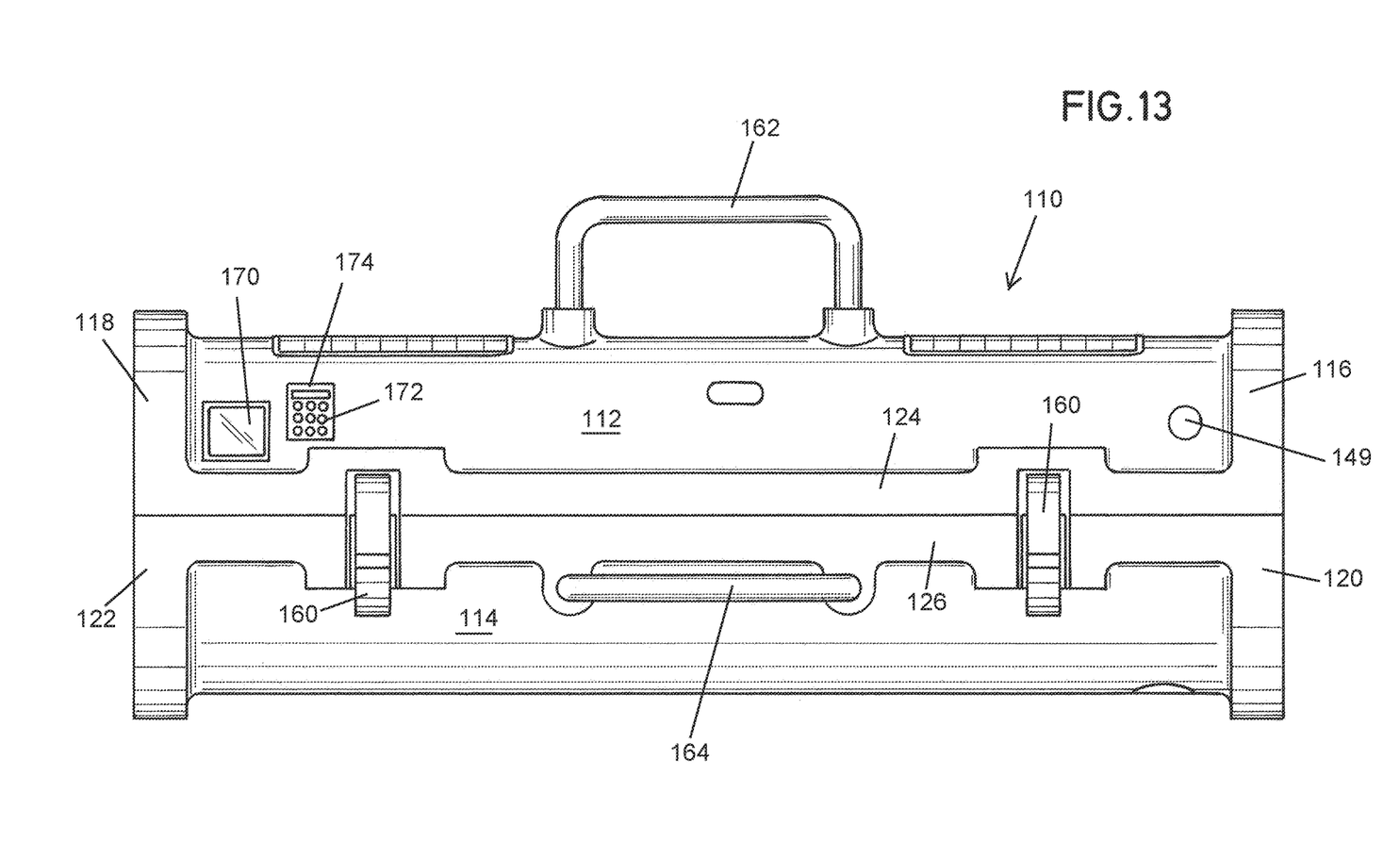
FIG. 13 is a side elevational view of another embodiment of the shroud of the present invention.
Figure 14:
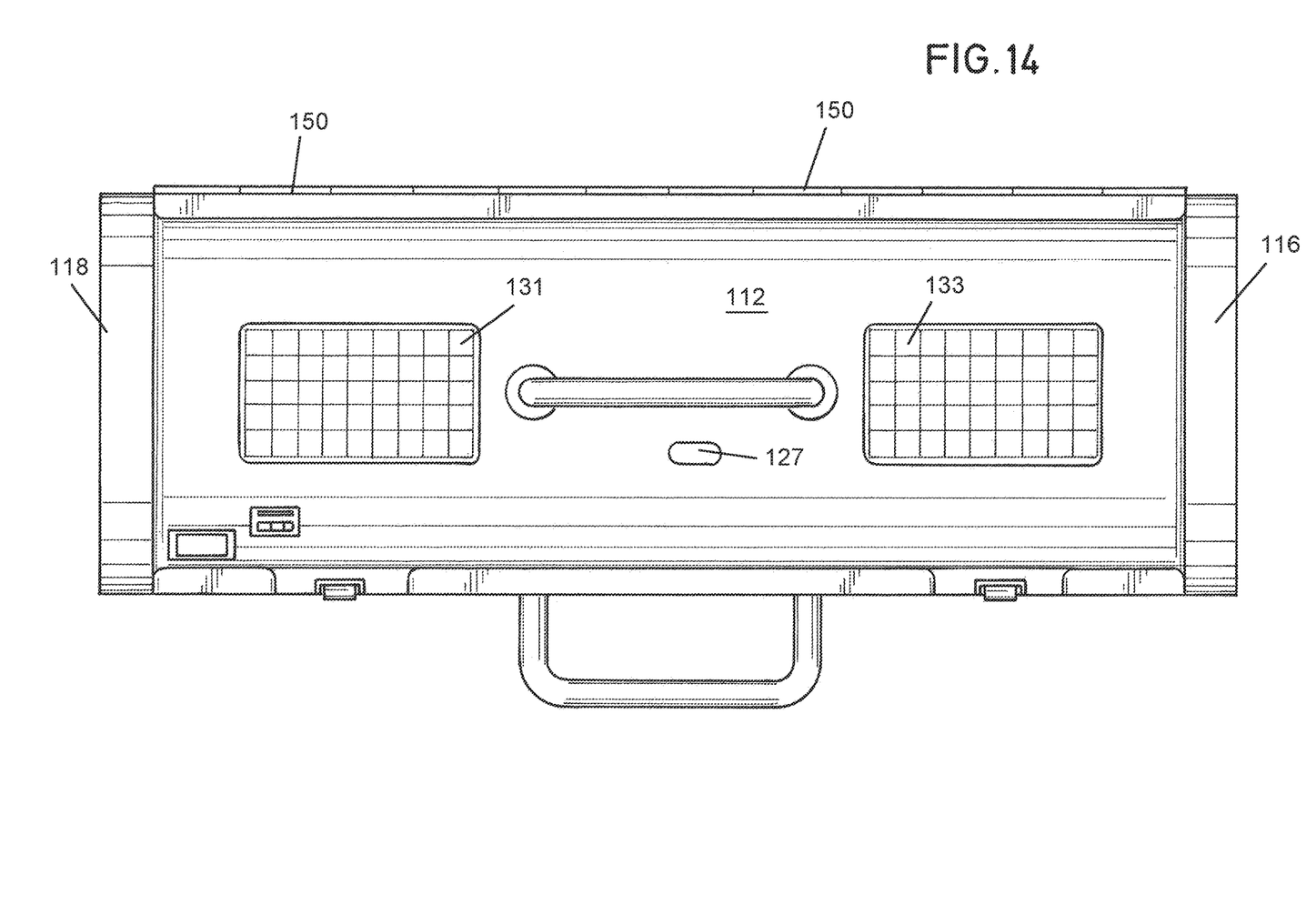
FIG. 14 is a top, plan view of the shroud shown in FIG. 13.
Figure 15:
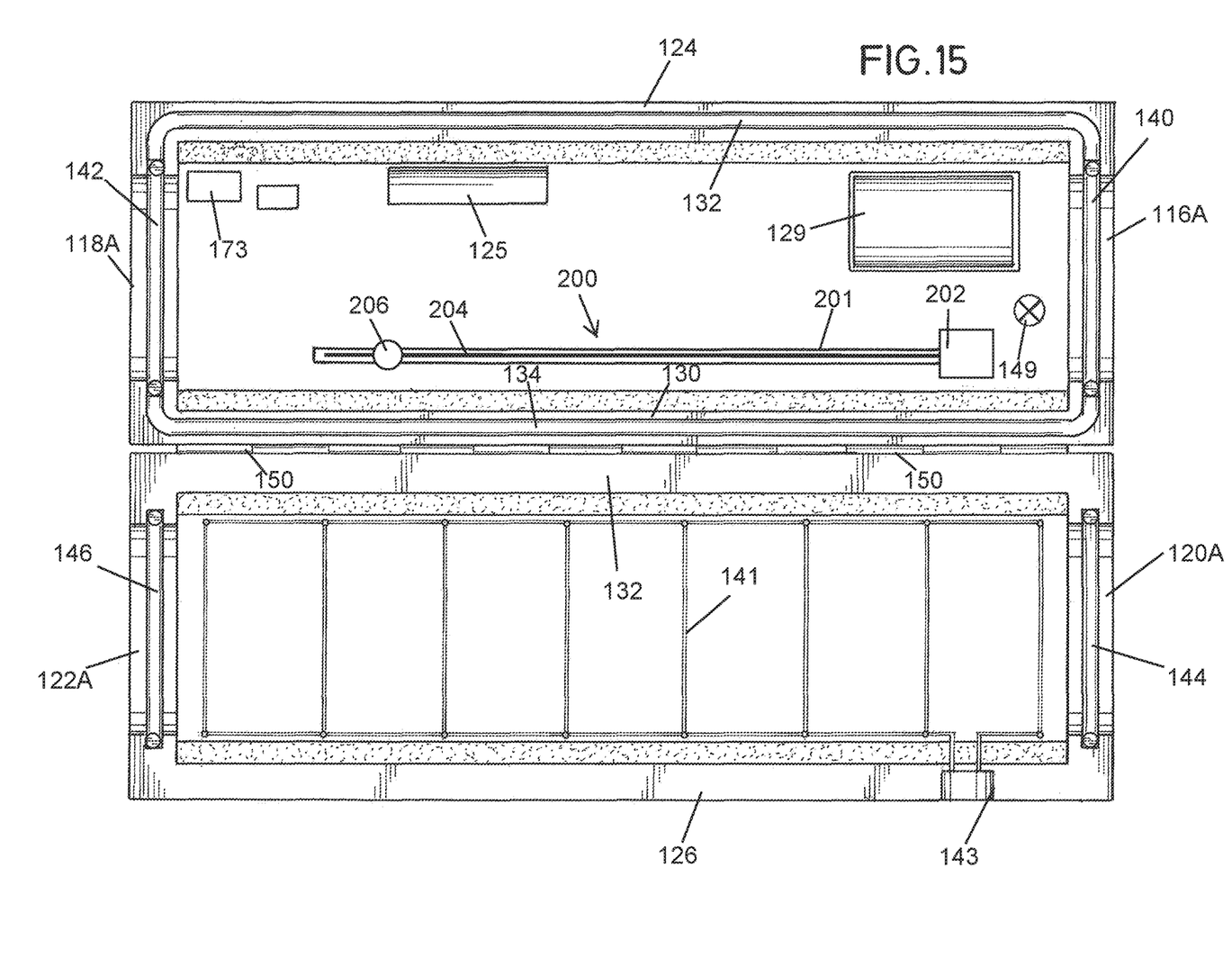
FIG. 15 shows the shroud of FIG. 13 in an open position.

Turning now to FIGS. 13-15 there is shown another embodiment of the shroud of the present invention. The shroud, shown generally as 110, comprises first and second semi-cylindrical housing sections 112 and 114, which when closed define a chamber. Housing section 112 has opposed end wall sections 116 and 118 while housing section 114 has end wall sections 120 and 122. As in the case of the other embodiments described above, each of the end wall sections 116-122 have semicircular openings 116A-122A, as shown in FIG. 15. Monolithically formed on diametrically opposite sides of shroud 110 are longitudinally extending flanges 124, 126, 130, and 132. As best seen in FIG. 15, flanges 124 and 130 have grooves in which are received resilient gaskets 132 and 134. As can also be seen, end wall plates 116, 118, 120, 122 also have gaskets 140, 142, 144, 146, respectively such that when shroud 110 is closed, as shown in FIG. 13, the chamber formed by the housing sections 112 and 114 is substantially sealed.

As can be seen with respect to FIGS. 14 and 15, housing sections 112 and 114 are hingedly connected together along flange edges 130 and 132 by hinges 150. On the diametrically opposite side, flanges 124 and 126 of housing sections 112 and 114, respectively, are releasably secured together by spring loaded toggle latch catch clamps 160 well known to those skilled in the art. It will thus be appreciated that when the shroud 110 shown in FIGS. 13-15 is in the closed and latched position as shown in FIG. 13, the sealing gaskets along the side edges and the end walls will form a closed chamber around a coated FJA. As seen, for example in FIG. 13, housing section 112 has a handle 162 while housing section 114 has a handle 164.

As seen in FIG. 13, mounted in the wall of housing section 112 is a small monitor 170 and a keypad 172 having a small monitor window 174. Monitor 170 displays information regarding the environmental conditions, e.g., temperature, relative humidity, dew point, etc. within the chamber formed in shroud 110 when shroud 110 is in the closed position and a coated FJA joint is being cured. To this end, the monitor is connected to a temperature/humidity sensor module 173. Suitable such sensors include those marketed by HiLetgo which are commercially available and well known to those skilled in the art. By monitoring temperature and relative humidity in the chamber while the coating on the coated FJA is curing, an inspector can determine whether conditions in the chamber are conducive to curing of the coating. Data from sensor 177 can be sent to and stored in an electronic module 125.

Keypad 172 allows an inspector to type in the number of the weld and other indices that may be required.

As noted, positioned in housing section 112 is an electronic module 125 providing LAN/Wi-Fi and Bluetooth connectivity whereby when the shroud is in use, i.e., during the curing cycle of the coating, an inspector with a handheld Bluetooth device can interrogate electronic module 125 to determine all data stored therein. There is an antenna 127 carried by housing section 112 which is operatively connected to the electronic module 125, whereby the handheld Bluetooth device can access the data stored in the electronic module 125. It will be appreciated that all data generated by the sensors in the chamber can be sent to an stored in electronic module 125

To provide electrical power to components such as the LAN, temperature/humidity sensor, etc., in the shroud there is a rechargeable battery 129 which in turn is connected to solar panels 131 and 133 mounted on the exterior of housing section 112 and connected to battery 129 whereby battery 129 can be recharged as needed.

Since the pipeline being laid may be in cold temperatures, to provide heat for curing of the coating of the coated FJA, there is a heating element 141 which is connected to a socket 143 extending through the wall of housing section 114. The socket 143 can be connected to an external source of power, e.g., AC power, so that the chamber formed by the shroud 110 can be heated by the heating element to a desired temperature to enhance curing of the coating.

Since the chamber formed by shroud 110 is essentially sealed as described above, any pressure build up within the chamber can be released through a pressure relief valve 149 extending through the wall of housing section 112.

It is well-known to those skilled in the art that when the mainline coating is being applied to the pipe segments in the shop before transport to the field, the coating is applied so as to have a desired thickness when cured. In any event, whatever the thickness of the mainline coating, it is desirable that the field applied coating on the FJA be of substantially the same thickness. To this end, there is a thickness scanner shown generally as 200 mounted on the interior of housing section 112 and extending for a substantial portion of the length of housing section 112. Scanner 200 can comprise a track or guide formed, for example, from a C-channel 201. A servo motor 202 drives an all thread screw drive 204 on which is mounted a carrier 206 on which is mounted a high intensity laser. Since motor 202 is reversible. Screw drive 204 can be rotated in both clockwise and counter clockwise directions. Accordingly, carrier 206, in response to rotation of screw drive 204 will sweep back and forth across the coated FJA and the mainline coatings on the two adjoined pipe segments. As noted, thickness scanner 200 extends longitudinally for a substantial portion of the length of housing 112. In other words, thickness scanner 200 overlies both the mainline coating on the adjoined pipe sections as well as the field pipe coating on the coated FJA. Accordingly, the thickness scanner which employs raster technology can scan and measure the thickness of the mainline coating relative to the thickness of the field applied coating of the coated FJA. As well, thickness scanner 200 can determine surface properties of the field applied coating to determine uniformity. This ensures that there is uniform thickness of the coated FJA vis-à-vis the mainline coating. Generally speaking, and depending upon the type of coating and size of pipe, the field applied coating will have a thickness ranging from about 20 to about 70 mils.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. An apparatus for shrouding a coated field joint area of connected pipeline segments, comprising:
    a split sleeve hinged along at least one pair of aligned longitudinal adjacent edges, said sleeve having first and second end walls forming inner sleeve end surfaces, said sleeve forming a chamber;
    resilient gasket inserts secured on said inner sleeve end surfaces;
    an environment monitor operatively disposed in said chamber to determine relative humidity and temperature inside said chamber; and
    a keypad mounted on an exterior of said sleeve.

2. The apparatus of claim 1, wherein there are resilient gasket inserts along aligned longitudinal adjacent edges of said split sleeve.

3. The apparatus of claim 1, wherein there is a latch assembly on and between free longitudinal edges of said split sleeve for selectively securing split sleeve sections together around said field joint area.

4. The apparatus of claim 1, wherein said sleeve has insulation on its inner wall surfaces.

5. The apparatus of claim 1, wherein said sleeve comprises at least two sleeve sections.

6. The apparatus of claim 1, wherein there is an electric heating element disposed in said chamber.

7. The apparatus of claim 1, wherein there is a pressure release valve in said split sleeve.

8. The apparatus of claim 1, wherein there is an electronic module disposed in said chamber, said electronic module including LAN/Wi-Fi connectivity.

9. The apparatus of claim 1, wherein there is a coating thickness scanner disposed in said chamber for determining the thickness of the coating on the coated field joint area as compared to the mainline coating.

10. The apparatus of claim 9, wherein said coating thickness scanner comprises a scanning element reciprocally movable longitudinally through said sleeve.

11. The apparatus of claim 1, further comprising a rechargeable battery for providing power to said environment monitor.

12. The apparatus of claim 11, further comprising solar panels mounted on the exterior of the sleeve and operatively connected to said rechargeable battery.

13. An apparatus for shrouding a coated field joint area of connected pipeline segments, comprising:
    a split sleeve hinged along at least one pair of aligned longitudinal adjacent edges, said sleeve having first and second end walls forming inner sleeve end surfaces, said sleeve forming a chamber, there being an electronic module disposed in said chamber, said electronic module including LAN/Wi-Fi connectivity;
    resilient gasket inserts secured on said inner sleeve end surfaces;
    an environment monitor operatively disposed in said chamber to determine relative humidity and temperature inside said chamber.

14. The apparatus of claim 13, further comprising a rechargeable battery for providing power to said environment monitor and/or said electronic module.

15. The apparatus of claim 14, further comprising solar panels mounted on the exterior of the sleeve and operatively connected to the rechargeable battery.

16. An apparatus for shrouding a coated field joint area of connected pipeline segments, comprising:
- a split sleeve hinged along at least one pair of aligned longitudinal adjacent edges, said sleeve having first and second end walls forming inner sleeve end surfaces, said sleeve forming a chamber, there being a coating thickness scanner disposed in said chamber for determining the thickness of the coating on the coated field joint area as compared to the mainline coating;
- resilient gasket inserts secured on said inner sleeve end surfaces;
- an environment monitor operatively disposed in said chamber to determine relative humidity and temperature inside said chamber.

17. The apparatus of claim 16, wherein said coating thickness scanner comprises a scanning element reciprocally movable longitudinally through said sleeve.

18. The apparatus of claim 16, further comprising a rechargeable battery for providing power to said environment monitor and/or said coating thickness scanner.

19. The apparatus of claim 18, further comprising solar panels mounted on the exterior of the sleeve and operatively connected to the rechargeable battery.

* * * * *